United States Patent
Porterfield

(10) Patent No.: US 6,360,289 B2
(45) Date of Patent: *Mar. 19, 2002

(54) SYSTEM FOR AUTONOMOUS CONFIGURATION OF PEER DEVICES

(75) Inventor: A. Kent Porterfield, New Brighton, MN (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/059,840

(22) Filed: Apr. 14, 1998

(51) Int. Cl.[7] .............................................. G06F 13/00
(52) U.S. Cl. ........................ 710/104; 710/127; 710/131
(58) Field of Search ................................ 710/100, 101, 710/104, 119, 129, 131

(56) References Cited

U.S. PATENT DOCUMENTS

| | | | |
|---|---|---|---|
| 4,222,990 A | | 9/1980 | Drechsel ..................... 423/158 |
| 4,456,956 A | | 6/1984 | El-Gohary et al. ......... 364/200 |
| 5,379,384 A | * | 1/1995 | Solomon ..................... 710/128 |
| 5,568,619 A | | 10/1996 | Blackledge et al. ........ 395/281 |
| 5,675,794 A | | 10/1997 | Meredith ..................... 395/651 |
| 5,692,219 A | * | 11/1997 | Chan et al. .................... 710/49 |
| 5,751,975 A | * | 5/1998 | Gillespie ..................... 710/126 |
| 5,832,238 A | * | 11/1998 | Helms ......................... 710/105 |
| 5,838,733 A | | 11/1998 | Bruckert ..................... 375/297 |
| 5,838,935 A | * | 11/1998 | Davis .......................... 710/129 |
| 5,859,987 A | * | 1/1999 | Gillespie ..................... 710/128 |
| 5,864,653 A | * | 1/1999 | Tavallaci ........................ 714/2 |
| 5,867,728 A | | 2/1999 | Melo et al. ..................... 710/8 |
| 5,872,941 A | | 2/1999 | Goodrum et al. ........... 395/308 |
| 5,907,689 A | * | 5/1999 | Tavallaci ..................... 710/110 |
| 5,983,303 A | * | 11/1999 | Sheafor ....................... 710/126 |

* cited by examiner

Primary Examiner—John F. Niebling
Assistant Examiner—Stacy Whitmore
(74) Attorney, Agent, or Firm—Knobbe, Martens, Olson & Bear, LLP

(57) ABSTRACT

A system for autonomously configuring peer devices without unnecessary delay in boot up time using a compatibility bridge. Upon initiating a configuration cycle, the compatibility bridge monitors the status of the configuration cycle on the host bus. The compatibility bridge determines whether and when to forward the configuration cycle to another bus, e.g., a PCI bus. The system records the presence or absence of a particular device by setting a respective bit in a scorecard register and scorecard valid register.

18 Claims, 5 Drawing Sheets

SYSTEM FOR AUTONOMOUS CONFIGURATION OF PEER DEVICES

RELATED APPLICATIONS

The subject matter of U.S. Patent Application entitled METHOD FOR AUTONOMOUS CONFIGURATION OF PEER DEVICES, filed on even date herewith, application Ser. No. 09/060,099 is related to this application.

BACKGROUND OF THE INVENTION

1. Field of the Invention

The invention relates generally to information processing systems. More particularly, this invention relates to control and data signal transfers within a computer system having a multiple bus architecture.

2. Description of the Related Art

Information processing systems, such as personal computers (PCs), have virtually become an inseparable part of everyone's daily activities. These systems process an enormous amount of information in a relatively short time. To perform these sophisticated tasks, a computer system typically includes a microprocessor, memory modules, various system and bus control units, and a wide variety of data input/output (I/O) and storage devices. These computer components communicate control and data signals using various data rates and signal protocols over multiple system buses. The demand for faster processing speed, and the revolutionary fast-rack development of computer systems, have necessitated the use of interconnecting devices. These devices act as compatibility bridges among various data transfer protocols within the computer system. One example of such interconnecting devices is the peripheral component interconnect (PCI) bridge.

The PCI Local Bus Specification, Revision 2.1 ("PCI Specification") defines a PCI Local Bus with the primary goal of establishing an industry standard. The PCI Local Bus is a 32-bit or 64-bit bus with multiplexed address and data lines. The bus is intended for use as an interconnect mechanism between highly integrated peripheral controller components, peripheral add-in boards, and processor/memory systems. The PCI Specification includes the protocol, electrical, mechanical, and configuration specification for PCI Local Bus components and expansion boards.

FIG. 1 shows an exemplary computer system using a conventional bus architecture. As shown in FIG. 1, a central processor unit (CPU) 100 is connected to a Host bus 110. On the Host bus 110, a plurality of host bus compatible devices (not shown in this figure) may be connected to access and exchange control and data signals with the CPU 100. Typically, a Host-PCI bridge 120 is employed to connect the Host bus 110 to a PCI Bus 0 130. The Host-PCI bridge 120 allows one or more PCI device to access devices that are resident on the Host bus 110 (e.g., the CPU 100). Typical PCI devices ("peer devices") include an audio card, a motion video card, a local area network (LAN) interface, a small computer system interface (SCSI), an expansion bus interface, a graphics card, or other PCI-PCI bridges.

To support industry standard architecture (ISA) devices, a PCI-ISA bridge 140 is used to connect an ISA bus 150 to the PCI bus 0 130. ISA devices may include a floppy drive, a key board, a mouse, a serial port, a parallel port, a read only memory (ROM) unit, a real-time clock (RTC), and/or an audio interface (not shown in this figure). In addition to the PCI-ISA bridge 140, one or more PCI-PCI bridges may be connected to the PCI bus 0 130 to generate additional PCI buses. Two PCI-PCI bridges are implemented including a PCI-PCI bridge 160 which generates a PCI bus 1 170, and a PCI-PCI bridge 180 which generates a PCI bus 2 190. The additional PCI buses 170 and 190 support additional PCI devices.

The PCI Specification provides for software driven initialization and configuration via a Configuration Address Space. Typically, systems provide a mechanism that allows generation of PCI configuration cycles by software. This mechanism is typically located in the Host-PCI bridge 120. PCI devices are often required to provide 256 bytes of configuration registers for this purpose. Each PCI device decodes its own address for normal accesses. To support hierarchical PCI buses, two types of configuration access are typically used: Type 0 and Type 1. Type 0 configuration accesses do not propagate beyond the local PCI bus (i.e., PCI bus 0 130). Hence, Type 0 configuration accesses are claimed by a local PCI device (i.e., resident on PCI bus 0 130). Whereas, a Type 1 configuration access is used when the target PC device of a configuration access resides on another PCI bus (i.e., not the local PCI bus). Type 1 accesses are ignored by all target devices except PCI-PCI bridges. A PCI-PCI bridge (e.g., PCI-PCI bridge 160) decodes a Bus Number field from the configuration access to determine if the destination of the configuration access is resident behind the PCI-PCI bridge. Accordingly, the PCI-PCI bridge 160 claims the configuration access if the access is to a bus behind the PCI-PCI bridge 160 (the "secondary bus"). If the Bus Number is not for a bus behind the PCI-PCI bridge 160, the PCI-PCI bridge 160 ignores the configuration access. If the Bus Number matches the secondary bus (i.e., PCI bus 2 190) of the PCI-PCI bridge 160, the PCI-PCI bridge 160 converts the Type 1 configuration access into a Type 0 configuration access. Then, a Device Number is decoded from the configuration access to select one of 32 devices on the local bus. The PCI-PCI bridge 160 asserts the correct Device Select and initiates a configuration access.

Recently, an OnNow design initiative was introduced as a comprehensive, system-wide approach to system and device power control. OnNow is a term for a PC that is always on but appears off and responds immediately to user or other requests. The OnNow design initiative involves changes that will occur in both the Microsoft Windows 98 and Windows NT operating systems, device drivers, hardware, and applications. OnNow relies on the changes defined in the Advanced Configuration and Power Interface (ACPI) v. 1.0 specification. The ACPI specification defines standards which enable PC systems to automatically turn on and off peripherals such as CD-ROMs, network cards, hard disk drives, and printers.

A configuration cycle comprises a series of read and/or write actions executed to set a device in a desired state or mode of operation. On a host bus, the configuration cycle is sometimes referred to as the "configuration transaction." On a PCI bus, the configuration cycle is commonly referred to as the "configuration cycle." For the purpose of this disclosure, the term "configuration cycle" is used to mean either "configuration cycle" or "configuration transaction."

In an attempt to speed up configuration cycles, and satisfy design initiatives such as OnNow, a watchdog timer may be implemented in the Host-PCI bridge 120. Upon initiating a configuration cycle by the CPU 100, and if a peer device is present in the system, the peer device responds to the configuration cycle. If a peer device is not installed in the system, the watchdog timer terminates the cycle after a predetermined critical time. If this critical time is too short, then configuration cycles for present peer devices may be terminated prematurely, thereby causing a system failure. If, on the other hand, the critical time is too long, then the system takes excessive time to configure peer devices and boot up the system. Laboratory measurements have shown that, while a system boot up is more certain with a longer critical time, the system may take several seconds longer than necessary to boot up. This excessive boot up time is incompatible with the new fast boot up standards, such as OnNow. Therefore, there is a need in the technology to expedite the configuration cycles without causing a system failure.

SUMMARY OF THE INVENTION

To overcome the above-mentioned problems, the invention provides a system for autonomously configuring peer devices without the unnecessary delay in boot up time. The system determines whether a configuration cycle is intended for a peer device on the Host bus, or for a device which may exist on the Local PCI bus. Once the presence of each peer device is determined, no further bus time-outs need occur.

In accordance with one embodiment of the invention, a system for configuring devices in an information processing system having first and second buses is provided. The system comprises a processor which initiates a configuration cycle to a device over the first bus. The system further comprises a bridge connected to the processor via the first bus. The bridge monitors the configuration cycle on the first bus, and communicates the configuration cycle to the second bus if the device does not respond to the configuration cycle. In another embodiment of the invention, the system comprises a processor which initiates a configuration cycle to a device over the first bus. The system further comprises a bridge connected to the processor via the first bus. The bridge communicates the configuration cycle to the second bus, and determines whether to utilize the result of the configuration cycle on the second bus.

BRIEF DESCRIPTION OF THE DRAWINGS

The above and other aspects, features and advantages of the invention will be better understood by referring to the following detailed description, which should be read in conjunction with the accompanying drawings, in which.

DETAILED DESCRIPTION OF THE INVENTION

A detailed description of the system for configuring peer devices is provided below. In describing particular embodiments of the invention, the disclosure is not intended to limit the enumerated claims, but to serve as a particular example of the invention.

Figure 1:
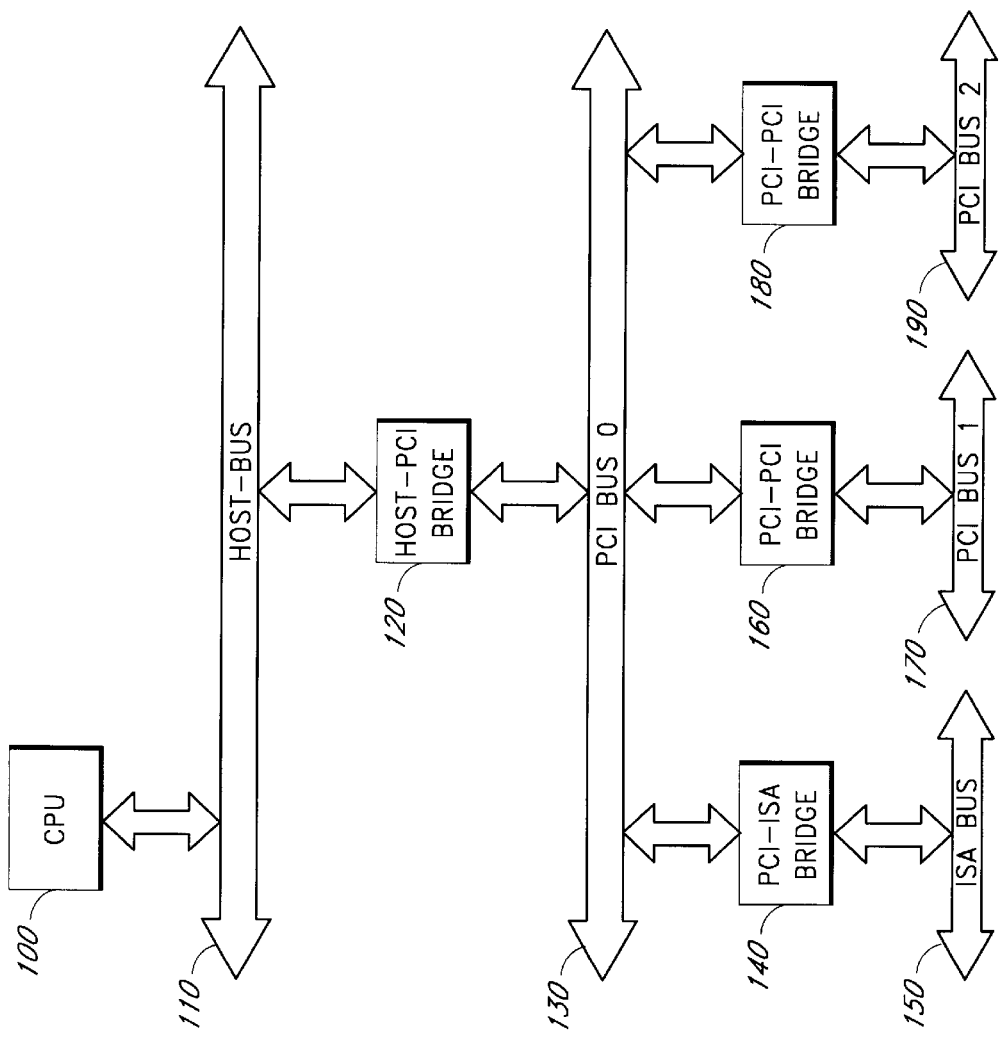
FIG. 1 is functional block diagram of a conventional hierarchical peripheral component interconnect (PCI) bridge architecture.
Figure 2:
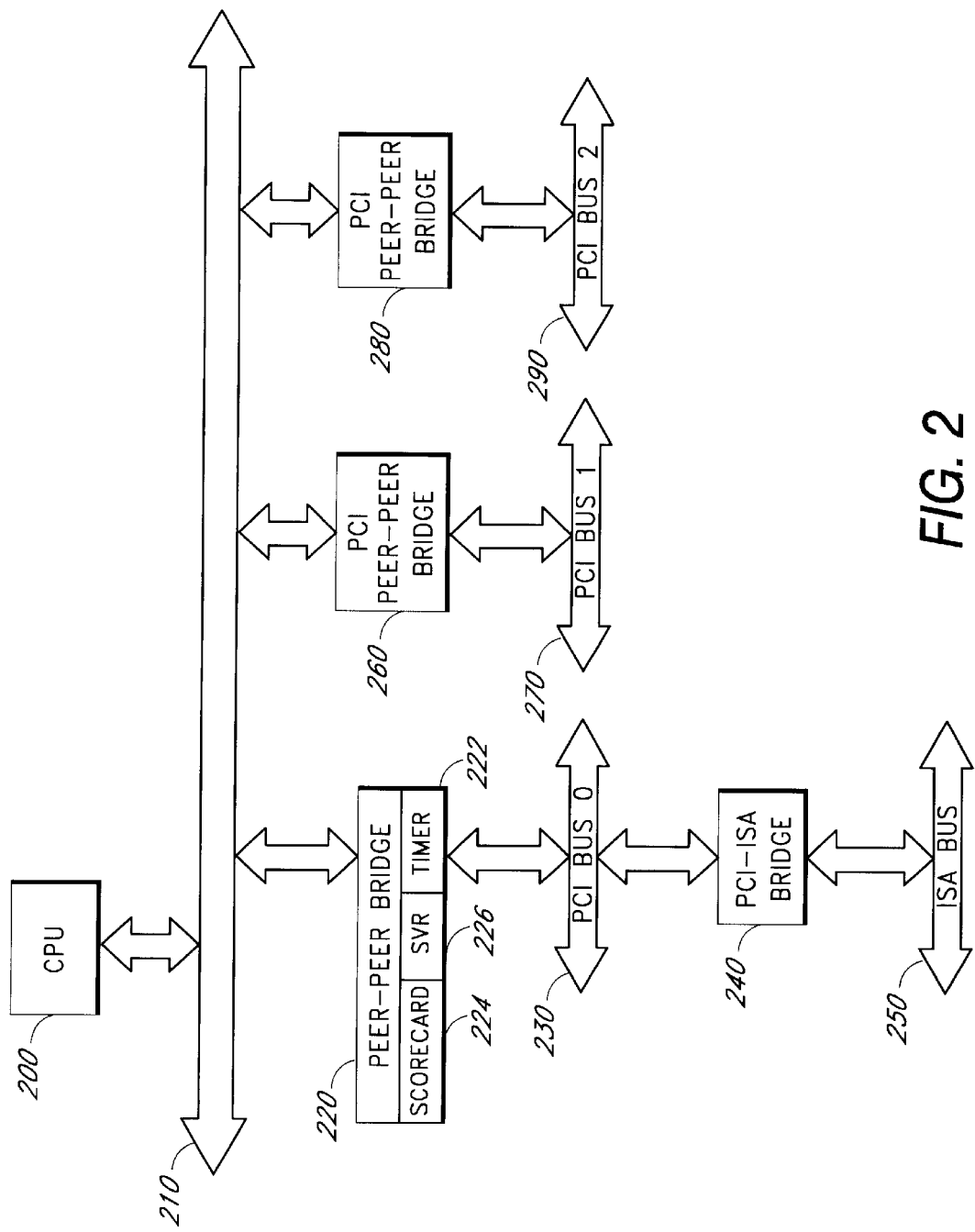
FIG. 2 is a functional block diagram of one embodiment of a peer to peer PCI bridge architecture.

In accordance with one embodiment of the invention, a system for configuring peer devices is provided in a computer system having up to 32 peer devices. FIG. 2 is a functional block diagram of one embodiment of a peer to peer PCI bridge architecture of the invention. As shown in FIG. 2, a CPU 200 is connected to a Host bus 210 to communicate control and data signals to and from other devices on the Host bus 210. Typically, one or more PCI-PCI bridges are connected to the Host bus 210 to allow PCI bus compatible device to communicate with host bus devices, e.g., the CPU 200. Each of the PCI-PCI bridges may be considered as a peer device. Hence, up to 32 PCI-PCI bridges may be connected to the Host bus 210. This invention applies to all types of peer devices and, hence, is not limited to PCI-PCI bridge peer devices.

In this embodiment, three PCI Peer-Peer bridges are shown connected to the Host bus 210: a first PCI Peer-Peer bridge 220, a second PCI Peer-Peer bridge 260, and a third PCI Peer-Peer bridge 280. The first PCI Peer-Peer bridge 220, connecting the Host bus 210 to the PCI bus 230, may be designated as the "compatibility bridge." The compatibility bridge 220 accepts all cycles which are not directed to any of the other PCI Peer-Peer bridges, e.g., PCI Peer-Peer bridge 260. The PCI Peer-Peer bridges 220, 260, and 280 connect to a PCI bus 0 230, PCI bus 1 270, and PCI bus 2 290, respectively. A PCI-ISA bridge 240 is connected to the PCI bus 0 230 to connect to an ISA bus 250, thereby allowing ISA devices to access the PCI and Host buses. The compatibility bridge 220 may include a scorecard register 224, a scorecard valid register (SVR) 226, and a watchdog timer 222. While each peer device is physically residing on the Host bus 210, each peer device may logically be considered to be residing on the PCI bus 0 230.

The compatibility bridge 220 employs the scorecard register 224 to determine which configuration cycles are directed to peer devices that physically reside on the Host bus 210, and which configuration cycles are directed to peer devices that physically reside on the PCI bus 0 230. Pursuant to the PCI Specification, up to 32 devices may be connected to a PCI bus. Hence, the scorecard register 224 comprises 32 bits, with each bit corresponding to a peer device. When a configuration cycle is initiated to a particular device, the compatibility bridge 220 checks the logical state of the bit corresponding to that device in the scorecard register 224. If the bit is set to 1, the compatibility bridge 220 forwards the configuration cycle to the PCI bus 0 230. If the bit is clear (i.e., set to 0), the compatibility bridge 220 does not claim the cycle on the Host bus 210 and, hence, does not forward the configuration cycle to the PCI bus 0 230. Accordingly, the compatibility bridge 220 allows another peer device to claim the configuration cycle on the Host bus 210.

Moreover, the compatibility bridge 220 employs the SVR 226 to determine that, since a system reset, at least one configuration cycle has been directed to a particular device. This determination is registered in the SVR 226 whether the configuration cycle is intended to a peer device, or to a PCI device which may or may not be physically present on the PCI bus 0 230 (shown in FIG. 2). The SVR 226 includes a bit structure which is identical to that of the scorecard register 224. System operators may not necessarily be able to access and make changes to data stored in the scorecard register 224 and SVR 226.

As noted above, the compatibility bridge 220 includes a watchdog timer 222. Once a configuration cycle is initiated on the Host bus 210, the watchdog timer 222 begins incrementing a counter (not shown) for each clock cycle until a peer device on the Host bus 210 responds to the configuration cycle. If a peer device responds, the counter is reset, and no further action is taken. If a peer device on the Host bus 210 does not respond within a predetermined period of time, then the watchdog timer 222 initiates a bus timeout. Upon detecting the bus timeout, the compatibility bridge 220 terminates the cycle on the Host bus 210. The cycle appears to the CPU 200 as having terminated normally.

In one embodiment, a system for configuring peer devices is implemented in hardware, thereby making configuration cycles transparent to software. The hardware implementation may be accomplished using state machine circuits, or by other implementation techniques which are well known in the art. Typically, a state machine is a digital sequential logic circuit ("circuit") which operates in accordance with current inputs and the circuit's current state. The current inputs refer to binary information received by the circuit from external sources. At any given time, the current state of the circuit is defined by binary information stored in the circuit's memory elements. The inputs, together with the present state of the memory elements, determine the binary information at the circuit's output.

Figure 3:
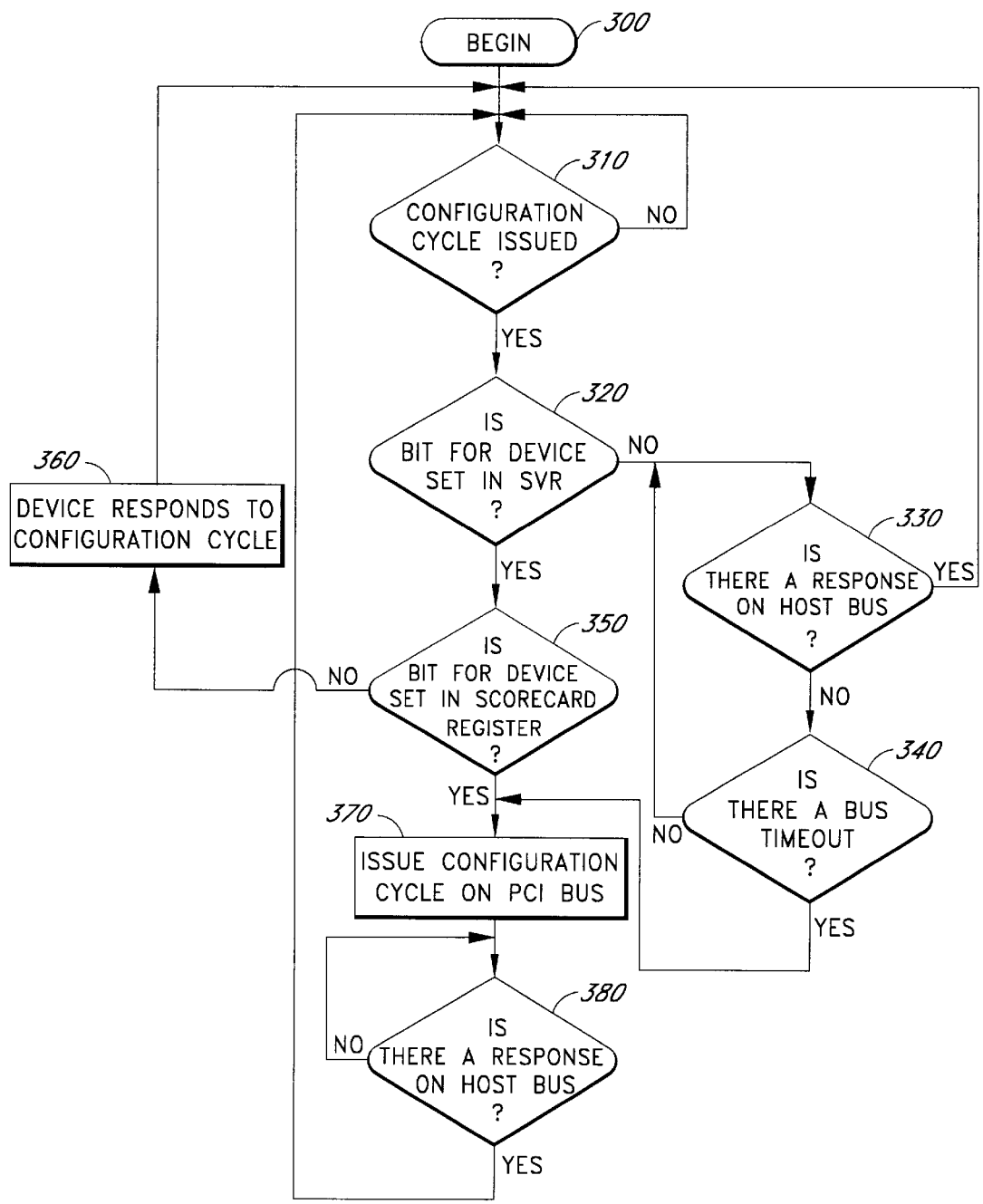
FIG. 3 is a flow chart describing the decisional steps of a first embodiment of the invention during a configuration cycle.

FIG. 3 is a flow chart describing the decisional steps of one embodiment of the invention during a configuration cycle. When a configuration cycle is initiated at step 300 (e.g., by the CPU 200), the compatibility bridge 220 performs steps to determine whether to claim the configuration cycle. As shown in FIG. 3, at step 310, the compatibility bridge 220 monitors the initiation of a configuration cycle. Upon initiation of a configuration cycle, at step 320, the compatibility bridge 220 checks the status of the bit, corresponding to the device which is intended by the configuration cycle, in the SVR 226. If the bit for the device is not set in the SVR 226, then at step 330, the compatibility bridge 220 determines if a device has responded to the configuration cycle on the Host bus 210. If a device has responded to the configuration cycle, then the process restarts by having the compatibility bridge 220 monitor the initiation of a new configuration cycle at step 310. If a device has not responded to the configuration cycle, then at step 340, the compatibility bridge 220 determines if the watchdog timer 222 has timed out. If the watchdog timer 222 has not timed out, then the compatibility bridge 220 returns to monitoring the response on the Host bus 210 and the bus timeout at steps 330 and 340, respectively. On the other hand, if the watchdog timer 222 initiates a bus timeout, then at step 370, the compatibility bridge proceeds to initiating a configuration cycle on the PCI bus 0 230.

If at step 320, the bit for the device is set in the SVR 226, then at step 350, the compatibility bridge 220 determines if the bit for the device is set in the scorecard register 224. If the bit for the device is not set in the scorecard register 224, then the device is present on the Host bus 210 and, thus at step 360, the device responds to the configuration cycle. If the bit for the device is set in the scorecard register 224, then at step 370, the compatibility bridge 220 issues the configuration cycle on the PCI bus 0 230 for execution. Since the bit for the device is set in the scorecard register 224, the device is logically present on the PCI bus 0 230. Hence, at step 380, the compatibility bridge 220 monitors the response of the device on the Host bus 210. Upon the responding to the configuration cycle, the device is configured and the process starts over at step 310 for a new configuration cycle.

Figure 4:
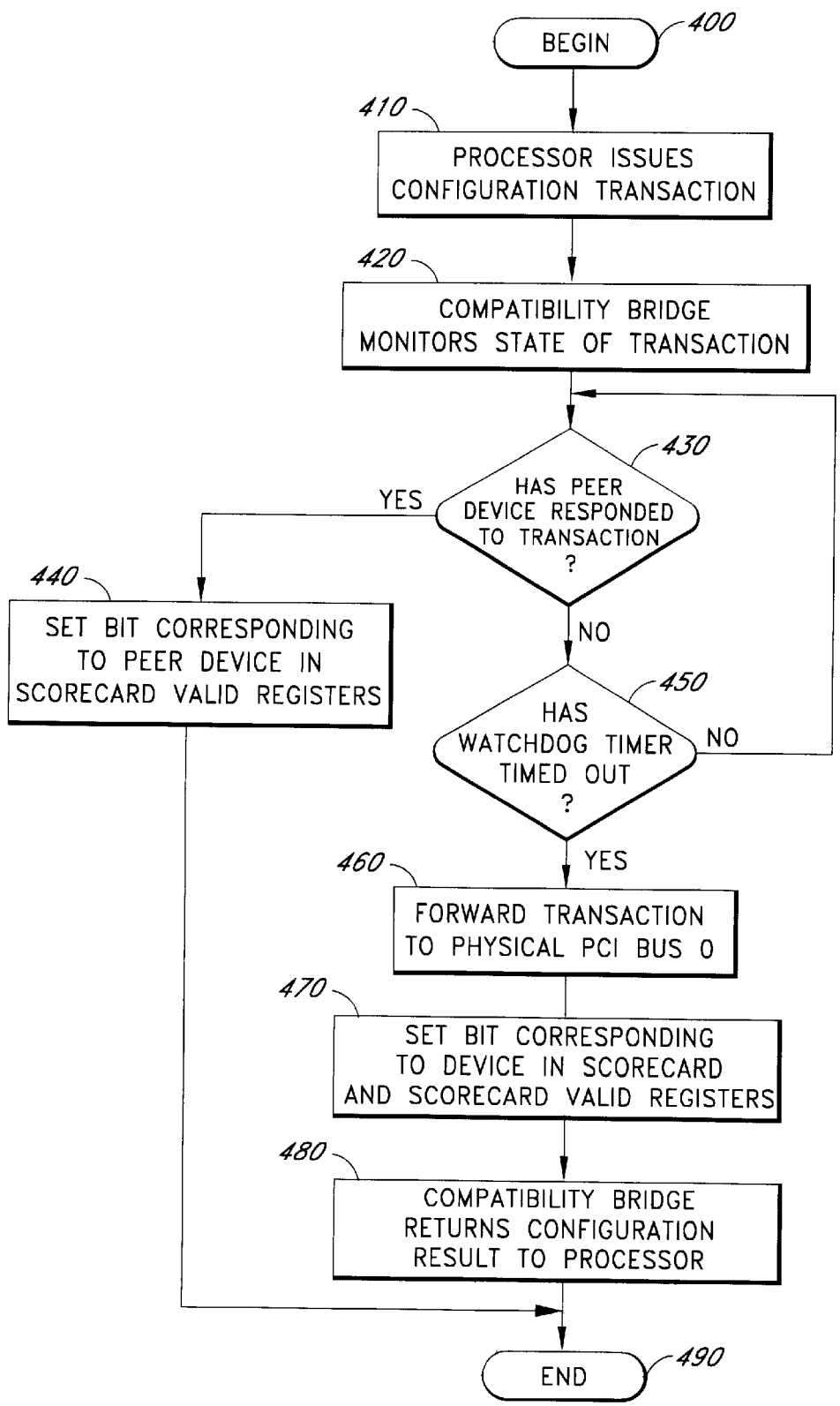
FIG. 4 is a flow chart describing the decisional steps of a second embodiment of the invention during a configuration cycle.

FIG. 4 is a flow chart describing the decisional steps of the second embodiment of the invention. At step 400, the process begins when the computer system is typically first powered up, or after a system reset. Normally, substantially all bits, corresponding to devices in the system, are clear in the scorecard register 224 and SVR 226. When substantially all bits are clear, no configuration cycles have been yet initiated to any device in the system. At step 410, the processor (e.g., the CPU 200 in FIG. 2) initiates a configuration cycle to a device in the system. At step 420, the compatibility bridge monitors the status of the initiated configuration cycle by monitoring the response on the Host bus 210. As noted above, upon initiating the configuration cycle, substantially all bits in the SVR 226 are clear. The SVR 226 indicates that system hardware does not know whether the intended device is present on the Host bus 210, present on the PCI bus 0 230, or not present in the system.

At step 430, the compatibility bridge 220 determines if a peer device has responded to the configuration cycle. If a peer device has responded to the configuration cycle, then at step 440, the compatibility bridge 220 sets the bit corresponding to that device in the SVR 226. The bit corresponding to that device remains clear in the scorecard register 224. In this manner, setting a device bit in the SVR 226 indicates that a configuration cycle was previously initiated to the device, and that the system hardware knows the location of the device (i.e., either on the Host bus 210 or the PCI bus 0 230). Hence, the status of the device bit in the scorecard register 224 is valid. Setting a device bit in the scorecard register 224 indicates that the device is not present on the Host bus 210. If, on the other hand, a peer device has not responded at step 430, then the compatibility bridge 220 determines if the watchdog timer 222 has timed out at step 450. If, the watchdog timer 222 has not timed out, then the compatibility bridge 220 continues monitoring the Host bus 210 for a response as in step 430 until the watchdog timer 222 times out.

When the watchdog timer 222 times out, at step 460, the compatibility bridge 220 forwards the configuration cycle to the physical PCI bus 0 230. The configuration cycle, in turn, terminates normally on the PCI bus 0 230. At step 470 the compatibility bridge 220 sets the bit corresponding to the responding device in the scorecard register 224 and SVR 226. Setting the bit corresponding to that device in the scorecard register 224 and SVR 226 indicates to the system hardware that the device is known not to exist on the Host bus 210. Accordingly, future configuration cycles targeting that device are directed to the physical PCI bus 0 230, where the device may or may not exist. At step 480, the compatibility bridge 220 returns the results of the configuration cycle to the initiating processor and concludes the configuration cycle. Hence, the configuration cycle is terminated at step 490.

Figure 5:
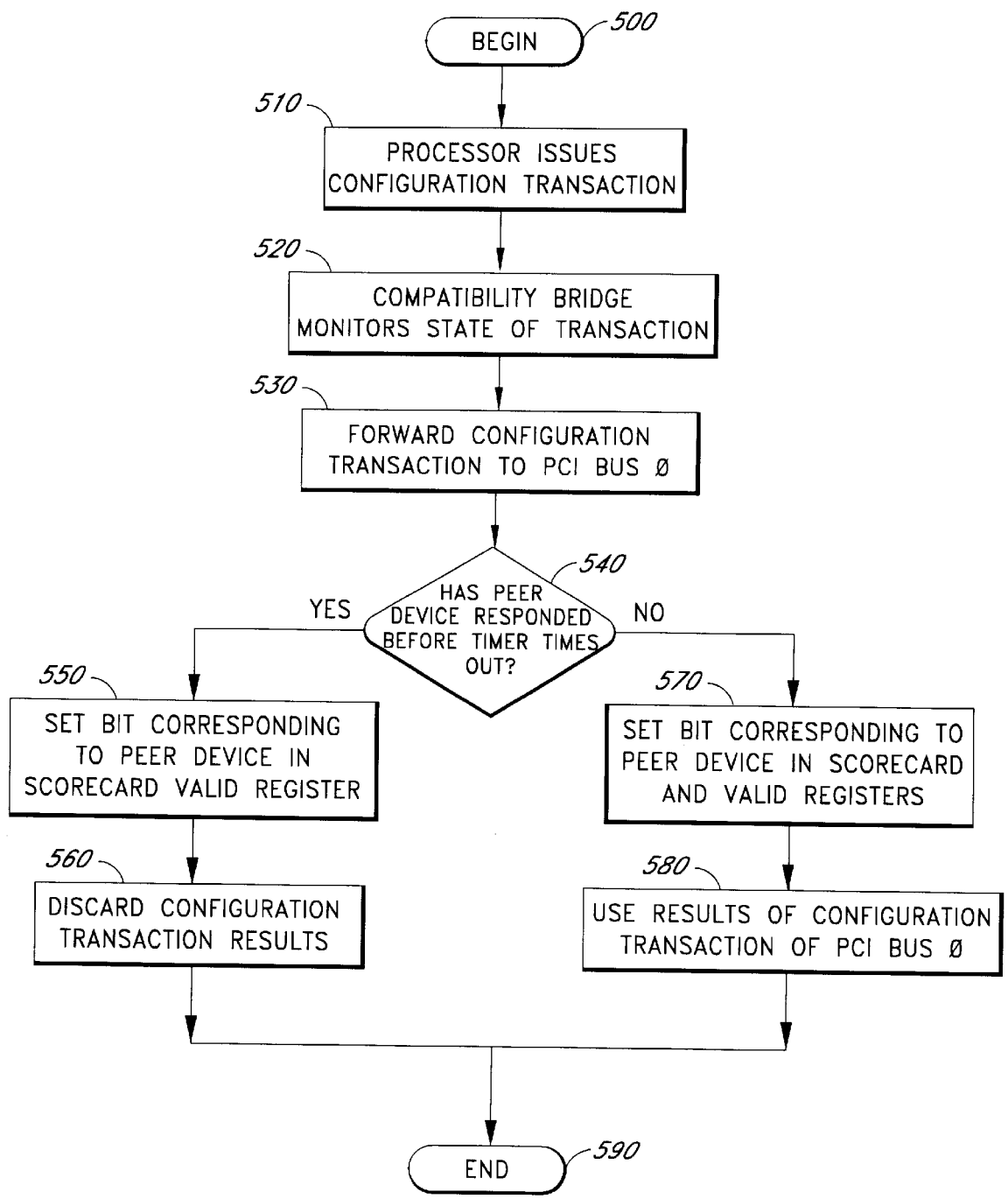
FIG. 5 is a flow chart describing the decisional steps of a third embodiment of the invention during a configuration cycle.

In a third embodiment, the decisional steps occurring during a configuration cycle are modified. The third embodiment is implemented in hardware, and may be based upon the PCI bus hierarchy shown in FIG. 2. Moreover, the third embodiment employs substantially similar hardware as that used in the second embodiment. More particularly, the third embodiment employs the scorecard register 224 and SVR 226 described above. FIG. 5 shows a flow chart describing the decisional steps of the third embodiment of the invention. As shown in FIG. 5, the steps 500, 510, and 520 are the same as the steps 400, 410, and 420, respectively, shown in FIG. 4.

As shown in FIG. 5, at step 530, the configuration cycle is forwarded to PCI bus 0 230 (shown in FIG. 2). Forwarding the configuration cycle may be performed before a time-out occurs on the Host bus 210. At step 540, the compatibility bridge 220 determines if a peer device has responded before the watchdog timer 222 times out. If a peer device has responded to the configuration cycle on the Host bus 210, then at step 550, the compatibility bridge 220 sets the bit corresponding to the device in the SVR 226. At step 560, the results of the configuration cycle from the PCI bus 0 230 may be ignored and discarded. If, on the other hand, a peer device does not respond to the configuration cycle on the Host bus 210 before the watchdog timer 222 times out, then at step 570, the compatibility bridge 220 sets the bit corresponding to the device in the scorecard register 224 and SVR 226. At step 580, the compatibility bridge 220 applies the results of the configuration cycle forwarded (i.e., initiated) to the PCI bus 0 230. The process terminates at step 590.

After implementing one of the above-described processes, no fixer bus time-outs occur in the system. Using the bit information in the scorecard register 224 and SVR 226, future configuration cycles are directly forwarded to the location of the particular device where installed. Hence, in booting up a computer system, minimal time is spent.

In view of the foregoing, it will be appreciated that the invention overcomes the long-standing need for a system for autonomously configuring peer devices without the disadvantages of improper system boot up, or unnecessary delay in boot up time. The invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for configuring devices in a computer having first and second buses, the system comprising:
    a processor which initiates a configuration cycle to a device over the first bus;
    a bridge directly connected between the first bus and the second bus, the bridge comprising:
        a first storage unit configured to maintain at least one bit that indicates the absence or presence of the device from the first bus;
        a second storage unit configured to maintain at least one bit that indicates occurrence of a previous response by the device to the configuration cycle; and
        wherein the bridge monitors and communicates the configuration cycle to the second bus if the at least one bit of the first storage unit indicates the absence of the device from the first bus.

2. The system as defined in claim 1, wherein the bridge is electrically connected to a timer to determine if the device has responded to the configuration cycle.

3. The system as defined in claim 1, wherein the bridge is electrically connected to the first and second storage units.

4. The system as defined in claim 1, wherein the bridge communicates the configuration cycle to the second bus after a time-out period.

5. The system as defined in claim 1, wherein the bridge is electrically connected to first and second registers, each having at least one bit corresponding to the device.

6. The system as defined in claim 1, wherein the bridge returns the result of the configuration cycle to the processor.

7. A system for configuring devices in a computer having first and second buses, the system comprising:
    a processor which initiates a configuration cycle to a device over the first bus;
    a bridge directly connected between the first bus and the second bus, the bridge comprising:
        a first storage unit configured to maintain at least one bit that indicates the absence or presence of the device on the first bus;
        a second storage unit configured to maintain at least one bit that indicates occurrence of a previous response by the device to the configuration cycle; and
        wherein the bridge is configured to communicate the configuration cycle to the second bus, and further configured to determine whether to utilize the result of the configuration cycle on the second bus.

8. The system as defined in claim 7, wherein the bridge is electrically connected to a timer to determine if the device has responded to the configuration cycle.

9. The system as defined in claim 7, wherein the bridge is electrically connected to the first and second storage units.

10. The system as defined in claim 7, wherein the bridge discards the result of the configuration cycle occurring on the second bus if the device responds to the configuration cycle.

11. The system as defined in claim 7, wherein the bridge applies the result of the configuration cycle occurring on the second bus if the device does not respond to the configuration cycle.

12. A system for configuring devices in a computer having first and second buses, the system comprising:
    means for initiating a configuration cycle to a device over the first bus;
    means for directly connecting the first bus and the second bus, the bridge means comprising:
        first means for storing at least one bit that indicates the absence or presence of the device from the first bus;
        second means for storing at least one bit that indicates occurrence of a previous response by the device to the configuration cycle; and
        wherein the connecting means monitors and communicates the configuration cycle to the second bus if the at least one bit of the first storage means indicates the absence of the device from the first bus.

13. The system as defined in claim 12, wherein the connecting means is electrically connected to a timer to determine if the device has responded to the configuration cycle.

14. A system for configuring devices in a computer having first and second buses, the system comprising:
    means for initiating a configuration cycle to a device over the first bus;
    means for directly connecting the first bus and the second bus, the connecting means comprising:
        first means for storing at least one bit that indicates the absence or presence of the device on the first bus;
        second means for storing at least one bit that indicates occurrence of a previous response by the device to the configuration cycle; and
        means for determining whether to apply the result of the configuration cycle on the second bus.

15. The system as defined in claim 14, wherein the connecting means is electrically connected to a timer to determine if the device has responded to the configuration cycle.

16. The system as defined in claim 14, wherein the connecting means is electrically connected to the first and second storage means.

17. The system as defined in claim 14, wherein the determining means discards the result of the configuration cycle occurring on the second bus if the device responds to the configuration cycle.

18. The system as defined in claim 14, wherein the determining means applies the result of the configuration cycle occurring on the second bus if the device does not respond to the configuration cycle.

* * * * *